United States Patent
Engelman et al.

(10) Patent No.: US 6,233,515 B1
(45) Date of Patent: May 15, 2001

(54) ADAPTIVE VEHICLE CRUISE CONTROL SYSTEM AND METHODOLOGY

(75) Inventors: Gerald H. Engelman, Dearborn, MI (US); Michael Julian Richardson, Redditch (GB); Philip Alexander Barber, Solihull (GB); Paul John King, Leicester (GB)

(73) Assignee: Jaguar Car, Limited, Whitley Coventry (GB)

( * ) Notice: Subject to any disclaimer, the term of this patent is extended or adjusted under 35 U.S.C. 154(b) by 0 days.

(21) Appl. No.: 09/207,007

(22) Filed: Dec. 7, 1998

(51) Int. Cl.[7] ............................................... B60K 31/04
(52) U.S. Cl. ............................. 701/96; 701/93; 701/301; 180/169; 180/179; 342/455; 340/903
(58) Field of Search ..................... 701/93, 94, 95, 701/96, 300, 301; 180/167–169, 176–179; 342/454, 455; 340/901, 903, 904, 435, 436

(56) References Cited

U.S. PATENT DOCUMENTS

| | | | |
|---|---|---|---|
| 4,622,636 | * 11/1986 | Tachibana | 701/96 |
| 5,053,979 | 10/1991 | Etoh | 364/565 |
| 5,396,426 | 3/1995 | Hibino et al. | 364/426.04 |
| 5,400,864 | 3/1995 | Winner et al. | 180/169 |
| 5,410,484 | * 4/1995 | Kunimi et al. | 701/96 |
| 5,454,442 | 10/1995 | Labuhn et al. | 180/169 |
| 5,467,284 | * 11/1995 | Yoshioka et al. | 701/96 |
| 5,493,302 | 2/1996 | Woll et al. | 342/71 |
| 5,495,251 | * 2/1996 | Gilling et al. | 180/167 |
| 5,529,139 | * 6/1996 | Kurahashi | 340/903 |
| 5,594,645 | 1/1997 | Nishimura et al. | 364/426.044 |
| 5,629,851 | 5/1997 | Williams et al. | 364/426.044 |
| 5,708,584 | * 1/1998 | Doi et al. | 701/96 |
| 5,749,426 | * 5/1998 | Gilling | 180/167 |
| 6,009,368 | * 12/1999 | Labuhn et al. | 701/96 |
| 6,044,321 | * 3/2000 | Nakamura et al. | 701/96 |

FOREIGN PATENT DOCUMENTS

| | | |
|---|---|---|
| 19848824 A1 | 5/1999 | (DE) . |
| 0982172 A2 | 3/2000 | (EP) . |

OTHER PUBLICATIONS

Mayr, Intelligent Cruise Control for Vehicle Based ob Feedback Linearigation, Proceedings of the American Control Conference, US, New York, IEEE, Jun. 29, 1994, pp. 16–20, XP000515245, ISBN: 0–7803–1784–X.

Youcef–Toumi et al., The Application of Time Delay Control to an Intelligent Cruise Control System, Proceedings of the American Control Conference, US, New York, IEEE, Jun. 24, 1992, pp. 1743–1747, XP000343593, ISBN: 0–7803–0210–9.

* cited by examiner

*Primary Examiner*—Gary Chin
(74) *Attorney, Agent, or Firm*—Mark L. Mollon

(57) ABSTRACT

Disclosed herein is a headway control for an adaptive cruise control system based on a basic headway control law derived from feedback linearization techniques. The usefulness of the linear approximations is demonstrated, and basic attributes of data which are believed important to system response are introduced. Certain modifications to a basic headway controller for enabling system performance to better meet driver expectations under real road conditions are made as a result of empirical information.

9 Claims, 4 Drawing Sheets

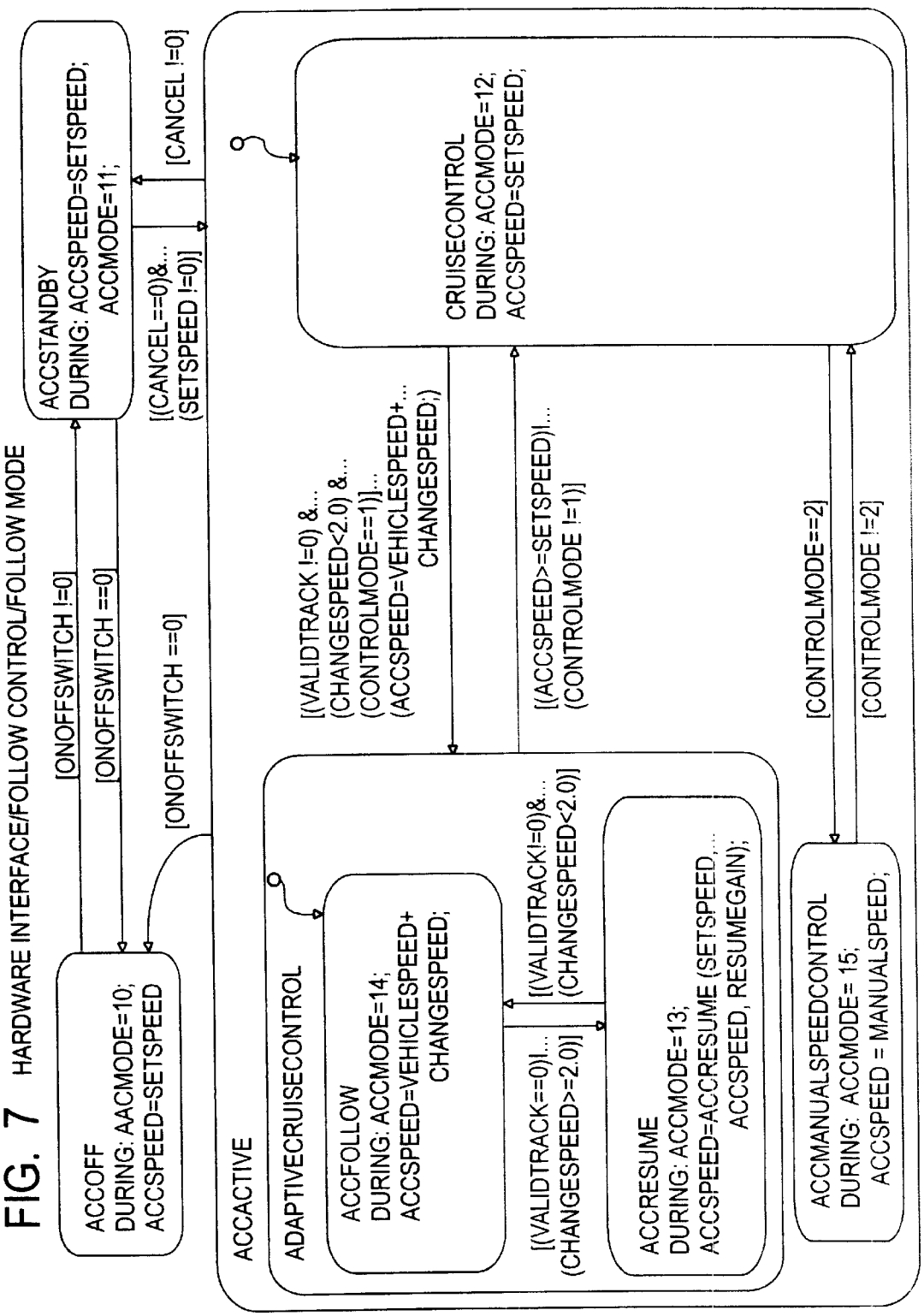
FIG. 7 HARDWARE INTERFACE/FOLLOW CONTROL/FOLLOW MODE
STATE TRANSITION DIAGRAM

ADAPTIVE VEHICLE CRUISE CONTROL SYSTEM AND METHODOLOGY

BACKGROUND OF THE INVENTION

1. Field of the Invention

This invention relates generally to adaptive cruise control systems for automotive vehicles, and more particularly to apparatus and methods for headway control.

2. Description of the Related Art

An adaptive cruise control (ACC) system can enhance performance of vehicle speed control, also known as vehicle cruise control, by allowing a vehicle to actively track and follow a target vehicle while maintaining a follow distance that is proportional to the timed headway between the vehicles plus some minimum distance. The speed of the follow vehicle is controlled by controlling the application of acceleration force to the vehicle over a range spanning positive and negative accelerations.

Positive acceleration, sometimes in context simply called acceleration, may be controlled via an electronic-actuated mechanism that exercises control over an engine or motor that propels the vehicle. A vehicle propelled by an internal combustion engine may have an electronic throttle control that controls the amount of engine throttle opening to thereby apply a corresponding acceleration force to the vehicle via a drivetrain of the vehicle.

Negative acceleration, sometimes called deceleration, may be applied to a vehicle via service brakes of the vehicle. In a vehicle that has hydraulic-actuated service brakes at wheels of the vehicle and an ABS system for operating the vehicle's service brakes, an adaptive cruise control may apply deceleration force to the vehicle via the ABS hydraulic system.

Various arrangements for adaptive cruise control are shown in various patents, including one or more of U.S. Pat. Nos. 5,053,979; 5,396,426; 5,400,864; 5,454,442; 5,493,302; 5,594,645; and 5,629,851.

SUMMARY OF THE INVENTION

One general aspect of the present invention relates to an automotive vehicle comprising: a powertrain comprising an engine having a throttle that is selectively operated to apply an acceleration force to the vehicle via wheels on which the vehicle is supported and propelled along an underlying surface; a vehicle speed control for selectively throttling the engine via the throttle to null discrepancy between actual vehicle speed and preset vehicle speed; range and range rate apparatus for providing range and range rate signals corresponding to range and range rate to an immediately preceding lead vehicle; and a headway controller that acts via the vehicle speed control for nulling discrepancy between range to the lead vehicle obtained by the ranging apparatus and a reference range that varies with timed headway; wherein the range and range rate apparatus and a vehicle speed sensor close feedback loops to the headway controller, the headway controller develops a reference speed signal which provides a command input to the vehicle speed control, and the reference speed signal comprises an algebraic summation of a term that is proportional to the vehicle's own speed as measured by the vehicle speed sensor, of a term that is proportional to range to the lead vehicle as measured by the range signal, and of a term that is proportional to range rate to the lead vehicle as measured by the range rate signal.

Another general aspect relates to an automotive vehicle comprising: a powertrain comprising an engine having a throttle that is selectively operated to apply an acceleration force to the vehicle via wheels on which the vehicle is supported and propelled along an underlying surface; a vehicle speed control for selectively throttling the engine via the throttle to null discrepancy between actual vehicle speed and preset vehicle speed; range and range rate apparatus for providing range and range rate signals corresponding to range and range rate to an immediately preceding lead vehicle; and a headway controller that acts via the vehicle speed control for nulling discrepancy between range to the lead vehicle obtained by the ranging apparatus and a reference range that varies with timed headway; wherein the range and range rate apparatus and a vehicle speed sensor close feedback loops to the headway controller, and the headway controller function for accelerating and decelerating the vehicle is mathematically defined by a plane where range error is along one of two orthogonal axes and range rate is along the other of the axes by a continuous control surface having plural distinct regions, a first region being a maximum acceleration region characterized exclusively by positive values of range rate, a second region being a maximum deceleration region characterized exclusively by negative values of range rate, a third region being a relatively more rigid control region, and a fourth region being a relatively less rigid control region, and wherein the first and second regions are noncontiguous and separated by the third and fourth regions, the third region has an expanse that, for negative values of range error within the third region, includes both positive and negative values of range rate, and for positive values of range error within the third region, includes positive, but excludes negative, values of range rate, and the fourth region has an expanse that, for negative values of range rate within the fourth region, includes both positive and negative values of range error, and for positive values of range rate within the fourth region, includes positive, but excludes negative, values of range error.

Still another general aspect relates to an automotive vehicle comprising: a powertrain comprising an engine having a throttle that is selectively operated to apply an acceleration force to the vehicle via wheels on which the vehicle is supported and propelled along an underlying surface; a vehicle speed control for selectively throttling the engine via the throttle to null discrepancy between actual vehicle speed and preset vehicle speed; range and range rate apparatus for providing range and range rate signals corresponding to range and range rate to an immediately preceding lead vehicle; a headway controller that is operable to different modes including an adaptive cruise control mode, that forms a portion of a closed-loop control wherein the range and range rate signals and a vehicle speed signal corresponding to actual vehicle speed provide closed loop feedback to the headway controller, and that develops a reference speed signal which provides a command signal input to the vehicle speed control for causing the vehicle speed control to null discrepancy between range to the lead vehicle as measured by the range signal and a reference range that varies with timed headway when the adaptive cruise control mode assumes a follow state; and upon losing the track of the lead vehicle while actual vehicle speed is less than preset speed, the headway controller is operable to transition from the follow state of the adaptive cruise control mode to a resume state of the adaptive cruise control mode to return vehicle speed toward preset vehicle speed as a function of lateral acceleration of the vehicle.

Other general and more specific aspects will been set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

FIG. 1 is a block diagram of an adaptive cruise control system.

FIG. 7 is a state transition diagram.

DETAILED DESCRIPTION OF THE PREFERRED EMBODIMENT

An adaptive cruise control (ACC) system can enhance performance of vehicle speed control, also known as vehicle cruise control, by allowing a vehicle to actively track and follow a target vehicle while maintaining a follow distance proportional to the timed headway, h, between the vehicles plus some minimum safety distance, $d_o$, timed headway being defined as $$h \equiv \frac{x_l - x_f}{\dot{x}_f}, \text{ seconds}$$

where $x_l$ and $x_f$ are defined as the lead vehicle position and the follow vehicle position respectively. The speed of the follow vehicle is controlled by controlling the application of acceleration force to the vehicle over a range spanning positive and negative accelerations.

Positive acceleration, sometimes simply called acceleration in proper context, may be controlled via an electronic-actuated mechanism that exercises control over an engine or motor that propels the vehicle. A vehicle propelled by an internal combustion engine may have an electronic throttle control that controls the amount of engine throttle opening to thereby apply corresponding torque through a drivetrain of the vehicle to driven wheels of the vehicle, hence applying a corresponding acceleration force to the vehicle.

Negative acceleration, sometimes called deceleration, may be applied to a vehicle via service brakes of the vehicle. An actual implementation in any particular vehicle will depend on particular details of the vehicle's brake system. For example, in a vehicle that has hydraulic-actuated service brakes at wheels of the vehicle and an ABS system for operating the vehicle's service brakes, an adaptive cruise control may apply deceleration via the ABS hydraulic system.

The distance between the two vehicles is the range, and the difference between the lead vehicle speed and the follow vehicle speed is the range rate, mathematically represented as:

R=range=$x_l$-$x_f$ $\dot{R}$=range rate=$\dot{x}_l$-$\dot{x}_f$

Figure 1:
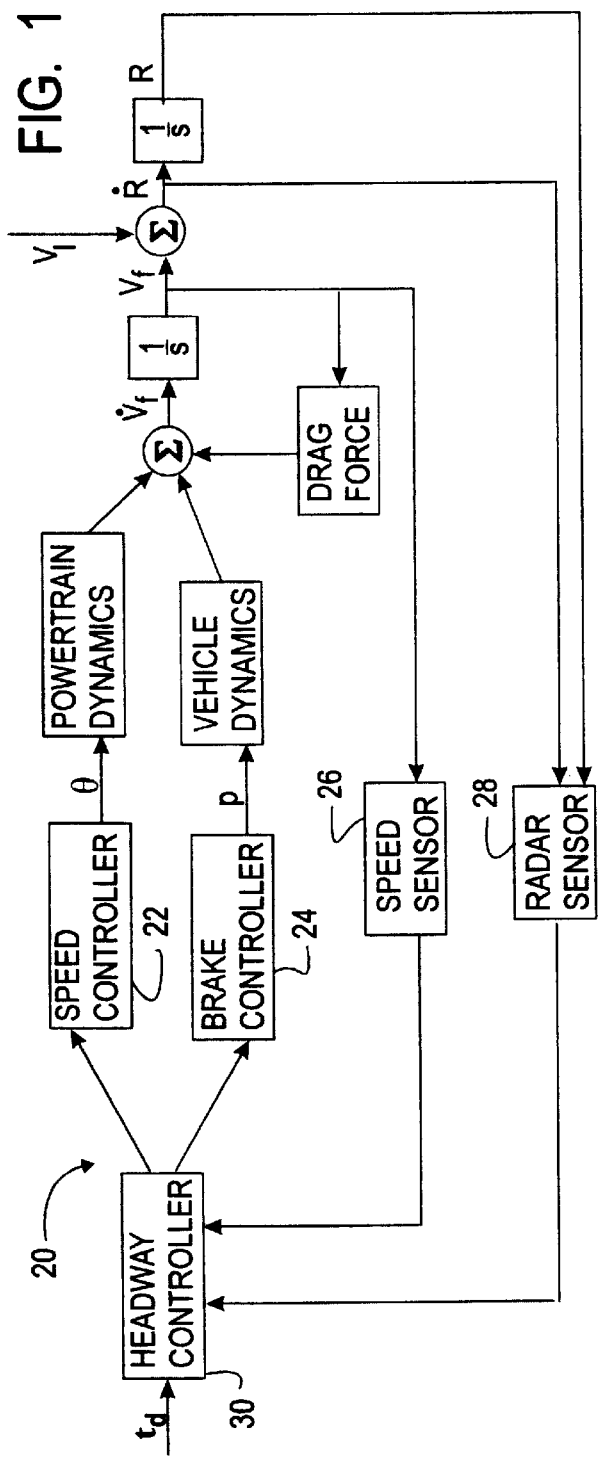

FIG. 1 shows a mathematical model of a control system 20 of an exemplary automotive vehicle. Variables containing an "l" subscript refer to the lead vehicle, and those containing an "f" subscript, the follow vehicle. The vehicle is powered by an internal combustion engine having an electronic throttle control for operating the engine throttle. The vehicle also has hydraulic-actuated service brakes at its wheels, and includes an ABS system for those brakes.

The vehicle further has a vehicle speed control 22, designated Speed Controller in FIG. 1, that, when switched on by a driver of the vehicle, can act via the throttle control to impart acceleration force to the vehicle. The symbol θ appearing in FIG. 1 represents throttle position corresponding to the degree of throttle opening.

The vehicle also has a service brake control 24, designated Brake Controller in FIG. 1, that acts to apply braking torque to the wheels via the vehicle's ABS hydraulics, hence applying deceleration force to the vehicle. The symbol P appearing in FIG. 1 represents hydraulic brake system pressure corresponding to braking force applied to the vehicle's wheels to decelerate the vehicle.

Attainment of a desired follow vehicle speed trajectory involves coordinated control over the selective operation of the engine throttle control to produce selective vehicle acceleration and over the selective operation of the service brakes to produce selective vehicle deceleration, while taking into account drag force acting on the vehicle. Speed controller 22 may be considered an acceleration function actuator, and brake controller 24, a deceleration function actuator. Collectively, such an acceleration function actuator and such a deceleration function actuator constitute a coordinated actuator for controlling the application of both acceleration and deceleration forces to the vehicle.

Also shown in FIG. 1 are a vehicle speed sensor 26 and a radar sensor 28. Vehicle speed sensor 26 may be a component of the existing vehicle speed control that supplies vehicle speed information. Radar sensor 28 senses both the range R and the range rate to provide respective range and range rate signals. A block 30 labeled Headway Controller may be embodied in the engine management system (EMS), such as in microprocessor electronics. It is headway controller 30 that embodies the application of inventive principles to the ACC.

Figure 2:
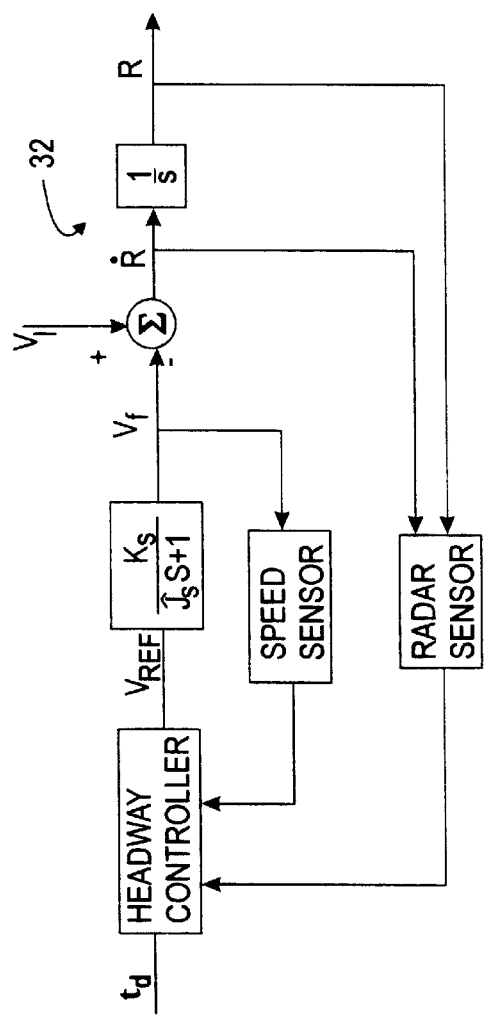
FIG. 2 is a reduced block diagram of the adaptive cruise control system of FIG. 1.

Certain aspects of the invention relate to a control system 32 shown in FIG. 2. Control system 32 has been derived as a reduced form of control system 20. Derivation of the reduced control system is premised on the presence of a coordinated actuator that provides a defined control range spanning both positive and negative accelerations and characterized by reasonably smooth switching between acceleration and deceleration function actuators (i.e. throttle control and brake control) whenever there is a transition from a positive acceleration to a negative one, and vice versa, such that a reference speed, vref, can be tracked.

$$\tau_s \dot{V}_f + V_f = K_s V_{ref}$$

The speed control and brake control systems are modeled herein as a linear first order system. While such modeling represents certain assumptions about overall system behavior, the model is believed suitable for the immediate present purpose. The use of vehicle speed as the controlled parameter that is controlled by the selective application of acceleration and deceleration forces, rather than the use of vehicle acceleration (positive and negative) as the controlled parameter, advantageously allows principles of the present invention to be incorporated into a vehicle that has an existing production cruise control system already imbedded in an existing engine management system (EMS) as the primary throttle actuator. This allows the inventive ACC system to take advantage of the existing throttle control diagnostics found in the EMS as well as allowing the headway control algorithm to be readily adapted to multiple powertrain configurations without the need to design at the level of detail required by direct throttle control.

Control synthesis utilizes feedback linearization control design techniques due to the resultant linear behavior of the system as well as good tracking characteristics. The control objective for the ACC system is defined to be: maintaining the range R equal to a distance proportional to the timed headway plus some minimum distance. Mathematically this can be expressed as $$\delta = (x_l - x_f) - (h\dot{x}_f + d_o)$$

where $\delta$ is defined as the range error. Differentiating the range error results in $$\dot{\delta} = (\dot{x}_l - \dot{x}_f) - (h\ddot{x}_f + h\dddot{x}_f)$$

The controller is designed to meet the desired range error dynamics defined as $$\tau\dot{\delta} + \delta = 0$$

Assuming the desired headway is nearly constant, $v_{ref}$ is defined as follows $$V_{ref} = \frac{1}{K_s}\dot{x}_f + \frac{\tau_s}{hK_s}(\dot{x}_l - \dot{x}_f) + \frac{\tau_s}{\tau hK_s}(\delta)$$

or in terms of the measured variables, $$V_{ref} = \frac{1}{K_s}V_f + \frac{\tau_s}{hK_s}\dot{R} + \frac{\tau_s}{\tau hK_s}(R - R_{des})$$

and it is this control function that is incorporated in the inventive ACC, such as by embedding it in the EMS as an algorithm that can be invoked when the cruise control function is switched on by the vehicle driver. This equation represents the desired control action to achieve a follow vehicle tracking response with the above defined error dynamics. One can see that the control function utilizes both range and range rate information as well as a follow vehicle speed feedforward command to achieve the desired tracking response. It is the follow vehicle speed feedforward command, the first term of the equation, that is believed novel in the context of an ACC.

The dynamics of the follow vehicle can be calculated to show that the speed of response of the follow vehicle speed to a change in lead vehicle speed will depend on the desired headway. The smaller the desired headway, the faster the follow vehicle will respond. While in theory, the range error, d, should be brought infinitesimally close to zero, mismatch in the control gains and plant uncertainty will make this precise behavior very difficult to achieve.

As mentioned above, the follow speed follows the lead speed with a first order behavior with the time constant equal to the desired headway. It should also be noted that at steady state, the follow speed does not equal the reference speed. This is directly due to the steady state error in the speed control system as modeled by $K_s$.

Although a known production vehicle speed control exhibits distinct non-linearity, actual testing in a vehicle so equipped has validated the usefulness of the linear assumptions of the present control synthesis. Tests were run such that the lead vehicle was traveling at approximately 30 m/s and the ACC equipped follow vehicle approached from behind at approximately 40 m/s. The linear model was found to represent a very reasonable approximation in terms of speed of response, overshoot and steady state error.

While future, more detailed, control synthesis and control system design may incorporate certain non-linear representations, it is believed that actual vehicle testing has confirmed the utility of the inventive control function using linear representation, as explained above. The correlation between actual test data and the linear model response is believed to validate use of a linear model for initial headway controller design. The linear model and linear system theory disclose that important aspects of control system behavior can be directly linked to parameters both within the control system and the vehicle itself, thereby providing a foundation by which more complicated non-linear system behaviors can be both examined and understood.

Control strategy in an actual test vehicle was chosen initially to reduce range error to zero as an inverse exponential function of time. The particular ACC system design was also chosen to mimic driver behavior in moderate traffic with the intent of extending the useful range of conventional cruise control. However, a number of different drivers of the test vehicle noticed certain response characteristics that included: uncomfortably high acceleration and deceleration; unnaturally aggressive headway control; and discontinuous control behavior during target acquire/drop sequence. One might therefore conclude that a control system which is more comfortable to the driver is a matter of human factors, at least to some extent. While it may be convenient to mathematically define the objective of the system as controlling to a timed headway, the possibility of different driver behaviors during certain real time events and of differing driver comfort levels may call for certain control modifications, although in general, the timed headway model seems to match driver behavior.

It was observed that many drivers attach importance to minimal control effort, particularly during brake usage, and smoothness of response that may override the stated control objective. Such driver response was especially evident during transient traffic conditions, such as rapid lead vehicle accelerations or cut-in situations. As designed, the control system attempts only to minimize range error and does not consider driver tolerance to acceleration, deceleration and the desire for strict headway control.

As a first attempt to better capture driver behavior in the control system, a limit on the maximum change in reference speed per sample interval was put at about 1 m/s for acceleration and −2.6 m/s for deceleration. These limits were empirically derived and roughly translate to limiting the commanded throttle and brake usage during transient target conditions. Additionally, the headway tracking characteristics of the system were changed by allowing overshoot in the range error dynamics. Headway following characteristics can thereby be altered to give a more desirable control response with a desired percent overshoot that gives the driver the perception of a more "relaxed" follow behavior. Through testing it was found that drivers liked a rather "loose" or "relaxed" control behavior under steady state following or when overtaking a slower vehicle. Conversely, if the follow vehicle is too close, such as after a cut-in, drivers expect the system to be noticeably more aggressive in controlling headway so that the driver is confident that the system will back off to the desired headway.

Figure 3:
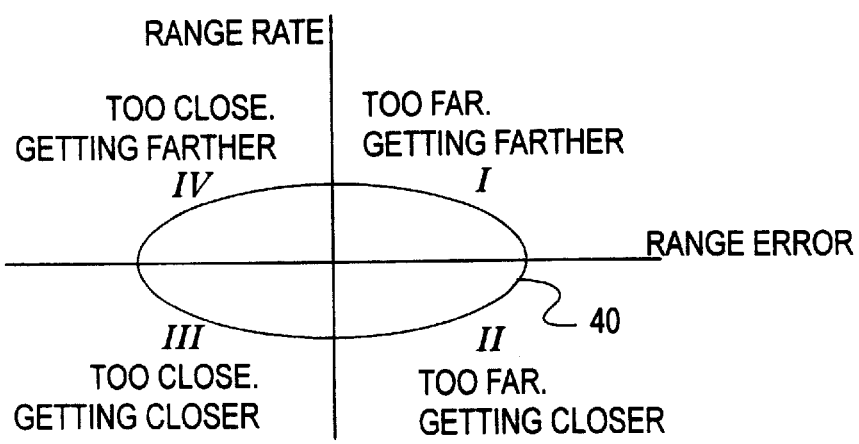
FIG. 3 is a diagram useful in explaining the control system.

To achieve this desired behavior, the gains were scheduled according to the system state on the Range Error/Range Rate phase plane of FIG. 3 which shows the phase plane divided into four quadrants each defining unique following states. Steady state following of a target vehicle occurs within by a small central zone 40 around the origin of the phase plane. Once control is established in zone 40, the control objective is to stay within that zone with minimal control effort.

The quadrant comprising Region I defines the state of the follow control where the follow vehicle is farther than the desired headway and is going slower than the lead vehicle, meaning that the control system is getting still farther away from the control objective. Because it is believed that driver preference is not to follow the lead vehicle if the accelerations required to re-enter the steady state follow zone 40 are "uncomfortably" high, the control objective in the portion of this quadrant outside zone 40 is to regain follow control if possible, but without overly abrupt throttle actuation, and without maximum acceleration that is excessive.

The quadrant comprising Region II defines the overtaking of a slower vehicle. The control objective here is to provide a smooth, stable trajectory into the steady state follow zone 40.

The quadrant comprising Region III defines a tailgating or potential collision scenario and is therefore especially significant. Because the ACC control system has been given only limited braking authority and is primarily concerned with maintaining a stable trajectory through this region, but only in the context of steady state following, a system that could provide a stable trajectory from within this region into the steady state follow zone 40 would be considered a collision avoidance system, and such a mode of operation is not contemplated within the scope of the disclosed ACC system. While the ACC system will by definition exhibit some collision avoidance properties, driver intervention is anticipated when a Region III condition outside of zone 40 arises because of the limited braking authority accorded the ACC system for accomplishing intended performance in other regions.

The quadrant comprising Region IV represents the follow vehicle backing off a lead vehicle which is too close, such as when a lead vehicle has just cut in front of the follow vehicle. The control objective within the portion of Region IV outside zone 40 is to provide a smooth, stable trajectory into zone 40.

Thus, in the portions of Regions I and III outside zone 40, the primary objective is to control, if possible, within the constraints of maximum acceleration or deceleration, or otherwise default out of follow control. In Region I, this means reverting back to conventional cruise control if the follow acceleration required to return to steady state exceeds some threshold. In Region III, the brakes can be applied only to some maximum value, beyond which it will be necessary for the driver to intervene. Ideally, Region II may be characterized by a "loose" headway controller that possesses some overshoot, and Region IV may be characterized by a more "rigid" headway coupling that gives the driver confidence in the system's ability to back off a lead vehicle that is too close.

Figure 4:
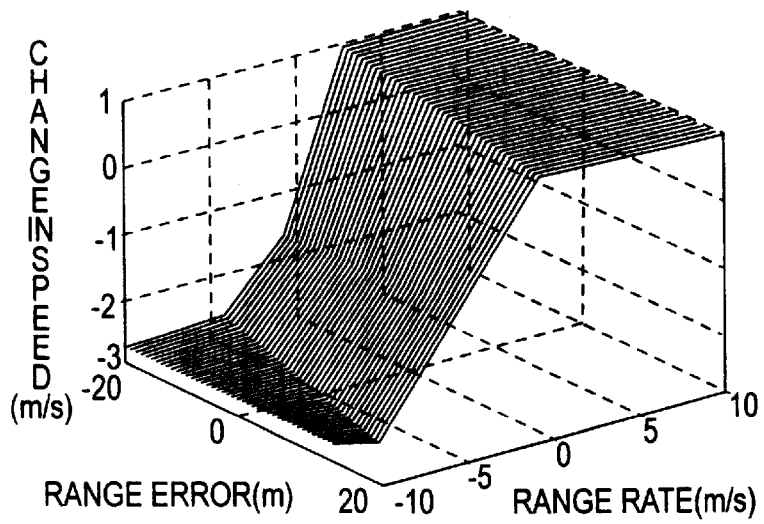
FIG. 4 is a three-dimensional graph plot of a control surface defining system operation.

In practice, a control system based on the above is realized by defining a piecewise continuous control surface over the phase plane that imparts the desired characteristics to the system. Such a control surface is shown by FIG. 4, and it comprises several distinct regions. Empirical studies have shown that the desired "loose" feel can be given to the system by suitable definition of one region of the control surface for coming into station or overtaking a slower vehicle. Similarly, the desired "rigid" feel is obtained by suitable definition of another region of the control surface for cut-in scenarios.

Empirical studies have shown that the desired "loose" feel can be given to the system by setting values for the control gains $k_p$ and $k_d$ as given below by way of example and denoted by the subscript s to designate the control gains for coming into station or overtaking a slower vehicle. Similarly, the desired "rigid" feel has been found by setting $k_p$ and $k_d$ as below by way of example and denoted by the subscript c to designate the control gains used in cut-in scenarios.

$k_{p,s}=0.06(1/s)$, $k_{d,s}=0.35$ $k_{p,c}=0.05(1/s)$, $k_{d,c}=0.6$

To combine these on the state plane and provide a smooth switching surface, the maximum function which is similar to the fuzzy implication of the logical 'OR' is used as in:

$$\Delta V_f = \max \begin{bmatrix} k_{p,s}R_e + k_{d,s}\dot{R} \\ k_{p,c}R_e + k_{d,c}\dot{R} \end{bmatrix}$$

When combined with the transient limits on acceleration and deceleration, the desired change to the speed reference signal per sample interval is thus given as:

$$\text{Change in Speed} = \begin{cases} \Delta V_{\min} : \Delta V_f < \Delta V_{\min} \\ \Delta V_f : \Delta V_{\min} \leq \Delta V_f \leq \Delta V_{\max} \\ \Delta V_{\max} : \Delta V_f > \Delta V_{\max} \end{cases}$$

Figure 5:
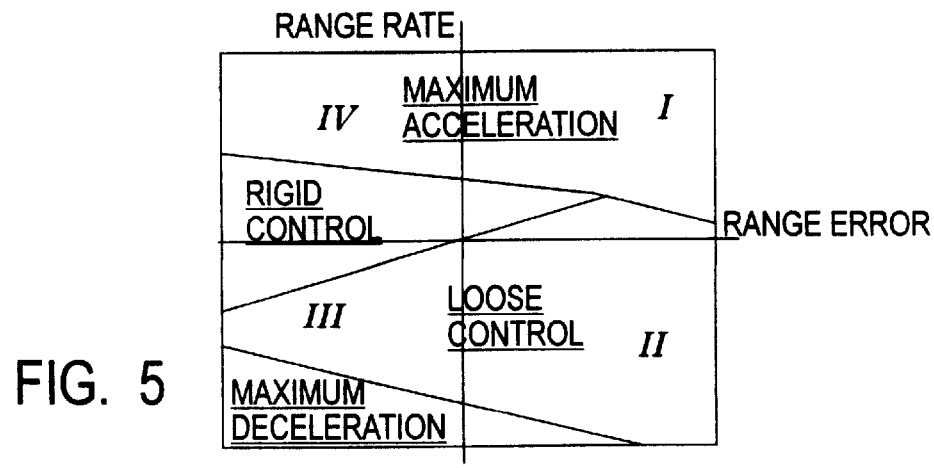
FIG. 5 is the graph plot of FIG. 4 viewed in two dimensions.

The resulting control surface is the one shown in FIG. 4, which can then be analyzed in terms of the objectives for each quadrant of the phase plane. FIG. 5 shows the phase plane with the control surface of FIG. 4 projected on it. As desired, Region I contains some control authority near the steady state region, but is mostly dominated by saturation of the maximum acceleration for driver comfort. Region II predominantly possesses "loose" control characteristics for coming into station. Region III has mostly "loose" control authority for smooth brake application and system stability. Region IV has "rigid" control authority near the steady state region.

While not fully ideal, the implementation using the maximum function provides for a piecewise continuous control surface and closely matches the desired phase plane control characteristics. It should be noted, however, that the division of the control in the phase plane is affected by the choice of the control gains for station and cut-ins. Thus, the desired overshoot characteristics and the division of the control structure are not mutually independent, a factor that could complicate finely tuning the control system.

In moderately dense traffic situations, the ACC system will see many different targets which are moving in and out of the lane of interest. Therefore, the control system must react seamlessly to the acquiring and dropping of new targets by the radar. This function is largely handled by the transient limits for acceleration and deceleration set in the Change in Speed function of FIG. 4. However, a special case arises when the desired change in speed causes the system to saturate the acceleration of the follow vehicle in Region I. If the saturation is excessive, the control system decides to drop out of ACC mode and resume the set speed maintained in memory which was set by the driver upon entering ACC follow mode. This is very much analogous to pushing the Resume button on conventional cruise control. When in this mode, the control system ramps the commanded speed from the current speed to the set speed at a nominal rate of 1 m/s².

This is considerably less than the upper transient limit on acceleration implemented in the Change in Speed function and is intended to mimic an automatic push of the Resume button. Therefore, if the lead vehicle begins a rapid acceleration or exits the lane entirely, the ACC system will smoothly return the vehicle into a conventional cruise control mode without the excessive accelerations that otherwise might make the driver uncomfortable. This logic is controlled by four basic parameters which are evaluated by the control system: valid target from the radar; speed error from equation (28); current vehicle speed; and ACC set speed.

Figure 6:
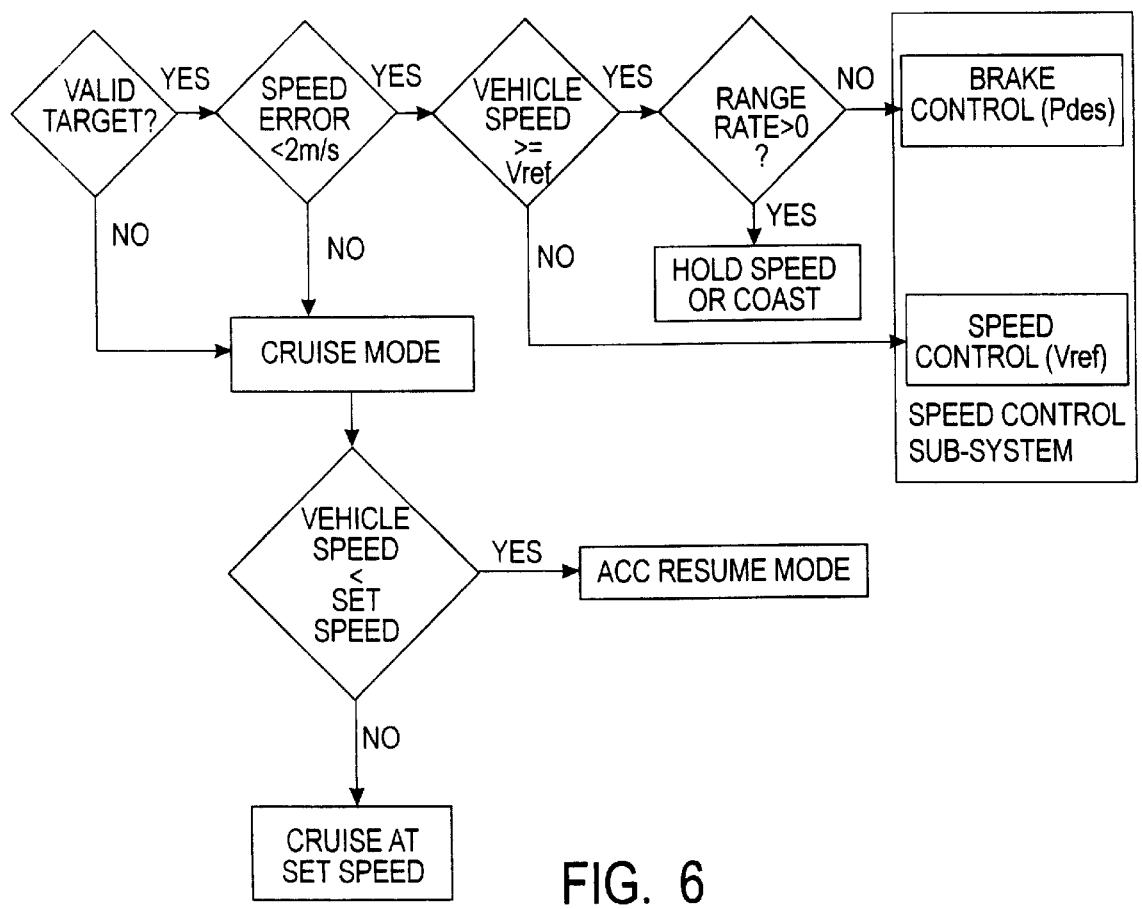
FIG. 6 is flow diagram.

The basic control logic can be seen in FIG. 6. If there are no valid targets for the ACC system or the valid target requires excessive acceleration to maintain the proper headway, the system defaults out to a conventional cruise control function with an automatic resume. vehicle is increasing. In such case the controller may cause the vehicle either to hold speed or to coast. This allows a return to headway control that is unaccompanied by speed changes which, it is believed, many drivers would consider excessive.

FIG. 7 shows a mode and state transition diagram that depicts various modes, including various discrete operating states within certain modes, and transitions between various modes and states. Defined modes are: ACCOff; ACCStandby; and ACCActive. Within the ACCActive mode either an AdaptiveCruiseControl state or a CruiseControl state may exist, and within the AdaptiveCruiseControl state, either an ACCFollow state or an ACCResume state may exist. Transitions between states occur in response to certain switch functions.

An On-off switch selects ACC. When it switches from "0" to "1", the mode transitions from ACCOff to ACCStandby, and when it switches from "1" to "0", the mode transitions back to ACCOff.

When the control is in the ACCActive mode, occurrence of a Cancel function, such as operation of a Cancel switch for example, will return control to ACCStandby mode. With the control in ACCStandby mode, operation of a Set Speed switch will cause control to enter ACCActive mode, provided that the Cancel switch is not being operated. Once in the ACCActive mode, whether the control assumes the CruiseControl state or the AdaptiveCruiseControl state will depend on factors that have been described above. When there is no target vehicle, or there is a default out of AdaptiveCruiseControl state, the control will transition to the CruiseControl state. When radar acquires a target vehicle (valid track) and conditions are proper for ACCFollow, that state is entered. In situations where the aforementioned excessive acceleration saturation occurs, the control will transition from ACCFollow state into ACCResume state. Once a valid track is reacquired, control reverts to ACCFollow state.

As mentioned earlier, the resume function nominally accelerates the vehicle at approximately 0.1 g up to the set speed. In the disclosed system, this acceleration rate is varied as a function of road curvature or, more precisely, lateral acceleration. Lateral acceleration is equivalent to other parameters such as yaw rate, or the amount of steering wheel turning. Current radar technology cannot see lines on the road to determine if the target is in the path of the ACC vehicle. If the road is straight, then the desired target is merely the closest target directly in front of the radar. However, if the road ahead curves, the target on boresight of the radar may not be in the ACC vehicle's lane.

Figure 8:
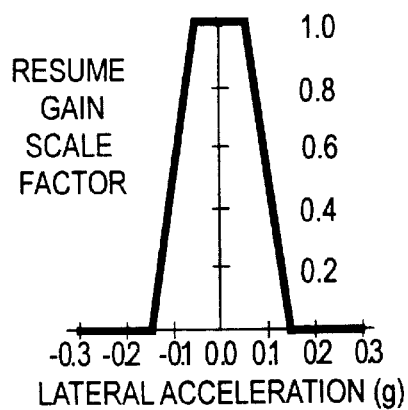
FIG. 8 is another graph plot related to another aspect of the invention.

In order to address this issue to at least some extent, the resume acceleration is reduced or inhibited based on estimated curvature. The function used to control the resume gain can be seen in FIG. 8. If the lane ahead of the ACC vehicle becomes clear, it is believed that the vehicle should resume to the set speed whether the road is curving or not. However, if the vehicle is following a lead vehicle around a curve and the radar momentarily loses the target, it is believed that the system should not start accelerating the vehicle towards the target. The function in FIG. 8 represents a way to modify the resume function to approximate the statistical likelihood that the radar will make an incorrect target assumption. If lateral acceleration is low, then the road is deemed nearly straight, and confidence in the radar is deemed high. As road curvature, and therefore lateral acceleration, increases, statistical confidence in the radar diminishes, and therefore the resume function is inhibited. Linearly scaling the resume gain with lateral acceleration creates a transition that distinguishes a range of events between those events when full acceleration is believed appropriate and those when no acceleration is believed appropriate.

Upon losing the track of the lead vehicle while actual vehicle speed is less than preset speed, the headway controller is operable to transition from the follow state of the adaptive cruise control mode to a resume state of the adaptive cruise control mode to return vehicle speed toward preset vehicle speed as a function of lateral acceleration of the vehicle. The function depicted by FIG. 8 comprises: completely inhibiting return of the vehicle speed toward present speed for lateral acceleration exceeding a predetermined maximum magnitude, and attenuating gain of the resume function in an inverse relation to the magnitude of lateral acceleration once the lateral acceleration has exceeded a predetermined minimum magnitude.

As the vehicle headway controller encounters traffic situations where other vehicles may be moving into and out of the field of view, certain headway controller functions may become mandatory. In the inventive headway controller, whenever the algebraic difference between the desired speed, as determined by the headway controller, and the actual vehicle speed becomes less than a predetermined value, the controller causes the vehicle's brakes to be applied. Also, whenever the range rate is positive, i.e., meaning the range is increasing, the controller is forbidden from causing the brakes to be applied, although the brakes may be applied by any other medium that has authority over brake application.

While a presently preferred embodiment has been illustrated and described, it is to be appreciated that the invention may be practiced in various forms within the scope of the following claims.

What is claimed is:

1. An automotive vehicle comprising:
  a powertrain comprising an engine having a throttle that is selectively operated to apply an acceleration force to the vehicle via wheels on which the vehicle is supported and propelled along an underlying surface;
  a vehicle speed control for selectively throttling the engine via the throttle to null discrepancy between actual vehicle speed and a reference vehicle speed;
  range and range rate apparatus for providing a range signal and a range rate signal corresponding respectively to range and range rate to an immediately preceding lead vehicle; and
  a headway controller that acts via the vehicle speed control for nulling discrepancy between said range to the immediately preceding lead vehicle obtained by the range and range rate apparatus and a reference range that varies with timed headway;

wherein the range and range rate signals and a vehicle speed signal corresponding to said actual vehicle speed provide closed loop feedback to the headway controller;

wherein the headway controller develops a speed reference signal which corresponds to the reference vehicle speed and provides a speed command input to the vehicle speed control, and the speed reference signal comprises an algebraic summation of a term that is proportional to the vehicle's own speed as measured by the vehicle speed sensor, of a term that is proportional to the difference between the reference range and the range to the immediately preceding lead vehicle as measured by the range signal, and of a term that is proportional to said range rate to the immediately preceding lead vehicle as measured by the range rate signal.

2. An automotive vehicle as set forth in claim 1 in which the vehicle further comprises a brake control system that is selectively operated to apply a deceleration force to the vehicle wheels, and the speed reference signal also provides a command signal input to the brake control system.

3. An automotive vehicle comprising:

a powertrain comprising an engine having a throttle that is selectively operated to apply an acceleration force to the vehicle via wheels on which the vehicle is supported and propelled along an underlying surface;

a vehicle speed control for selectively throttling the engine via the throttle to null discrepancy between actual vehicle speed and a reference vehicle speed;

range and range rate apparatus for providing a range signal and a range rate signal corresponding respectively to range and range rate to an immediately preceding lead vehicle; and a headway controller that acts via the vehicle speed control for nulling discrepancy between said range to the immediately preceding lead vehicle obtained by the range and range rate apparatus and a reference range that varies with timed headway;

wherein the range and range rate signals and a vehicle speed signal corresponding to said actual vehicle speed provide closed loop feedback to the headway controller;

and wherein the headway controller develops a speed reference signal which corresponds to the reference vehicle speed and provides a speed command input to the vehicle speed control, and the headway controller executes a function for accelerating and decelerating the vehicle that is mathematically defined by a piecewise continuous surface wherein change in the speed reference signal per unit of time measurement $\Delta V_f$ is defined as a function of both range error $R_e$ and range rate $\dot{R}$ by the maximum function:

$$\Delta V_f = \max \begin{bmatrix} k_{p,s} R_e + k_{d,s} \dot{R} \\ k_{p,c} R_e + k_{d,c} \dot{R} \end{bmatrix}$$

where the values of $k_{p,s}$, $k_{d,s}$, $k_{p,c}$, and $k_{d,c}$ are selected to provide relatively less rigid feel for some sets of values of said range error and said range rate and relatively more rigid feel for other sets of values of said range error and said range rate.

4. An automotive vehicle as set forth in claim 3 in which the vehicle further comprises a brake control system that is selectively operated to apply a deceleration force to the vehicle wheels, and the speed reference signal also provides a command signal input to the brake control system.

5. An automotive vehicle as set forth in claim 4 in which for a first further set of values of said range error and said range rate, the maximum function is limited to a predetermined maximum acceleration, and for a second further set of values of said range error and said range rates the maximum function is limited to a predetermined maximum deceleration.

6. An automotive vehicle comprising:

a powertrain comprising an engine having a throttle that is selectively operated to apply an acceleration force to the vehicle via wheels on which the vehicle is supported and propelled along an underlying surface;

a vehicle speed control for selectively throttling the engine via the throttle to null discrepancy between actual vehicle speed and a reference vehicle speed;

a headway controller that is operable to different modes including an adaptive cruise control mode;

range and range rate apparatus for providing a range signal and a range rate signal corresponding respectively to range and range rate to an immediately preceding lead vehicle;

wherein the range and range rate signals and a vehicle speed signal corresponding to said actual vehicle speed provide closed loop feedback to the headway controller, and the headway controller develops a speed reference signal which corresponds to the reference vehicle speed and provides a command signal input to the vehicle speed control for causing the vehicle speed control to null discrepancy between said range to the immediately preceding lead vehicle as measured by the range signal and a reference range that varies with timed headway when the adaptive cruise control mode assumes a follow state;

and upon losing the track of the immediately preceding lead vehicle while said actual vehicle speed is less than the reference vehicle speed, the headway controller is operable to transition from the follow state of the adaptive cruise control mode to a resume state of the adaptive cruise control mode to return vehicle speed toward the reference vehicle speed as a function of lateral acceleration of the vehicle;

and wherein said function of lateral acceleration of the vehicle comprises attenuating gain of the resume function in an inverse relation to the magnitude of the lateral acceleration once the lateral acceleration has exceeded a predetermined minimum magnitude.

7. An automotive vehicle as set forth in claim 6 in which said function of lateral acceleration of the vehicle further comprises completely inhibiting return of the vehicle speed toward the reference vehicle speed for said lateral acceleration exceeding a predetermined maximum magnitude.

8. An automotive vehicle comprising:

a powertrain comprising an engine having a throttle that is selectively operated to apply an acceleration force to the vehicle via wheels on which the vehicle is supported and propelled along an underlying surface;

a vehicle speed control for selectively throttling the engine via the throttle to null discrepancy between actual vehicle speed and a reference vehicle speed;

a headway controller that is operable to different modes including an adaptive cruise control mode;

range and range rate apparatus for providing a range signal and a range rate signal corresponding respectively to range and range rate to an immediately preceding lead vehicle;

wherein the range and range rate signals and a vehicle speed signal corresponding to said actual vehicle speed provide closed loop feedback to the headway controller, and the headway controller develops a speed reference signal which corresponds to the reference vehicle speed and provides a command signal input to the vehicle speed control for causing the vehicle speed control to null discrepancy between said range to the immediately preceding lead vehicle as measured by the range signal and a reference range that varies with timed headway when the adaptive cruise control mode assumes a follow state;

and upon losing the track of the immediately preceding lead vehicle while said actual vehicle speed is less than the reference vehicle speed, the headway controller is operable to transition from the follow state of the adaptive cruise control mode to a resume state of the adaptive cruise control mode to return vehicle speed toward the reference vehicle speed as a function of lateral acceleration of the vehicle;

and wherein the speed reference signal comprises an algebraic summation of a term that is proportional to the vehicle's own speed as measured by the vehicle speed sensor, of a term that is proportional to the difference between the reference range and the range to the immediately preceding lead vehicle as measured by the range signal, and of a term that is proportional to range rate to the immediately preceding lead vehicle as measured by the range rate signal.

9. An automotive vehicle comprising;

a powertrain comprising an engine having a throttle that is selectively operated to apply an acceleration force to the vehicle via wheels on which the vehicle is supported and propelled along an underlying surface;

a vehicle speed control for selectively throttling the engine via the throttle to null discrepancy between actual vehicle speed and a reference vehicle speed;

a brake control system that is selectively operated to apply a deceleration force to the vehicle wheels;

range and range rate apparatus for providing a range signal and a range rate signal corresponding respectively to range and range rate to an immediately preceding lead vehicle; and a headway controller that acts via the vehicle speed control for nulling discrepancy between said range to the immediately preceding lead vehicle obtained by the range and range rate apparatus and a reference range that varies with timed headway;

wherein the range and range rate signals and a vehicle speed signal corresponding to said actual vehicle speed provide closed loop feedback to the headway controller;

wherein the headway controller develops a reference speed signal which corresponds to the reference vehicle speed and provides a command input to both the vehicle speed control and the brake control system;

and the headway controller prevents the reference speed signal from causing the brake control system to apply deceleration force to the vehicle wheels whenever the range rate is positive.

* * * * *